(12) United States Patent
Karlov et al.

(10) Patent No.: US 9,909,866 B2
(45) Date of Patent: Mar. 6, 2018

(54) SYNTHETIC DIGITAL SEXTANT FOR NAVIGATION

(71) Applicant: Raytheon Company, Waltham, MA (US)

(72) Inventors: Valeri I. Karlov, Stony Brook, NY (US); John D. Hulsmann, Miller Place, NY (US); Aaron Maestas, Mckinney, TX (US); Christopher J. Cormier, Anna, TX (US); Anthony Sommese, Northport, NY (US); Owen Lewis, St. Inigoes, MD (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 14/933,997

(22) Filed: Nov. 5, 2015

(65) Prior Publication Data

US 2017/0131096 A1    May 11, 2017

(51) Int. Cl.
*G01C 1/10*      (2006.01)
*G01C 21/02*     (2006.01)
*G01C 21/16*     (2006.01)

(52) U.S. Cl.
CPC ............. *G01C 1/10* (2013.01); *G01C 21/025* (2013.01); *G01C 21/165* (2013.01)

(58) Field of Classification Search
CPC ....... G01C 1/10; G01C 21/025; G01C 21/165
USPC .............. 701/510–513, 518, 519; 250/203.6; 244/3.16, 3.18, 3.2
See application file for complete search history.

(56) References Cited

U.S. PATENT DOCUMENTS

| | | | |
|---|---|---|---|
| 3,312,423 A | 4/1967 | Welch | |
| 3,491,228 A | 1/1970 | Selvin | |
| 3,769,710 A | 11/1973 | Reister | |
| 3,968,570 A | 7/1976 | Leuchter, Jr. | |
| 3,985,446 A | 10/1976 | Feldman et al. | |
| 4,707,926 A | 11/1987 | Decker, Jr. | |
| 5,159,401 A * | 10/1992 | Decker, Jr. ............... | G01C 1/00 33/282 |
| 5,903,007 A | 5/1999 | Savoca | |
| 7,542,849 B2 * | 6/2009 | Twitchell, Jr. ....... | G01C 21/025 701/500 |
| 8,594,840 B1 | 11/2013 | Chiappetta et al. | |
| 2006/0085130 A1 | 4/2006 | Belenkii et al. | |
| 2006/0282217 A1 * | 12/2006 | Twitchell, Jr. ....... | G01C 21/025 701/500 |

(Continued)

OTHER PUBLICATIONS

Kaptuch, "Skymark Selection Algorithm for a Space-Based Navigational Concept", Thesis, Aug. 9, 2002, pp. 161, Massachusetts Institute of Technology, Massachusetts, USA.

(Continued)

*Primary Examiner* — Marthe Marc-Coleman

(57) ABSTRACT

Technology for determining a position of a platform is described. A location of a horizon line can be determined using a sensor onboard the platform. One or more celestial objects in the sky can be detected using the sensor onboard the platform. Differential angular measurements between the horizon line and at least one of the celestial objects in the sky can be determined over a duration of time. The position of the platform can be determined based on the differential angular measurements between the horizon line and the celestial objects.

20 Claims, 8 Drawing Sheets

(56) References Cited

U.S. PATENT DOCUMENTS

| | | | | |
|---|---|---|---|---|
| 2009/0177398 | A1* | 7/2009 | Belenkii | G01C 21/025 701/500 |
| 2011/0004405 | A1 | 1/2011 | Hutchin | |
| 2011/0010129 | A1* | 1/2011 | Kirby | G01B 11/002 702/153 |
| 2012/0290199 | A1* | 11/2012 | Nadam | G01C 21/005 701/409 |
| 2013/0006449 | A1* | 1/2013 | Hindman | G01C 21/24 701/13 |
| 2013/0103343 | A1* | 4/2013 | Liu | G01C 21/24 702/141 |

OTHER PUBLICATIONS

Kenneth et al, "Precision Position, Navigation, and Timing without the Global Positioning System", Air and Space Power Journal, 2011, pp. 11, Wright-Patterson Air Force Base, Ohio, USA.

Profiles in Success, "07 Optical Physics Company", http://www.opci.com/wp-content/uploads/2014/08/OPCin14Profiles02.pdf, Aug. 2014, 2 pages.

Benfield, Automated Marine Navigation, Navigation Journal of the Institute of Navigation, Jun. 15, 1964, pp. 353-365, vol. 11, No. 4, United States.

Noack, An optimized celestial-inertial navigation system, http://lib.dr.iastate.edu/cgi/viewcontent.cgi?article=3942&context=rtd, 1963, 56 pages, Ames, Iowa.

Qian et al., A novel navigation method used in a ballistic missile, Measurement Science and Technology, Sep. 10, 2013, 10 pages, IOP Publishing Ltd, United Kingdom and United States.

Umland, A Short Guide to Celestial Navigation, http://www.celnav.de/page2.htm, Jun. 5, 2015, 98 pages.

Wikipedia, Celestial navigation, http://en.wikipedia.org/w/index.php?title=Celestial_navigation&oldid=686993464, Oct. 2015, 8 pages.

* cited by examiner

SYNTHETIC DIGITAL SEXTANT FOR NAVIGATION

BACKGROUND

A sextant is a doubly reflecting navigation instrument used to measure an angle between two visible objects. The primary use of the sextant is to determine the angle between an astronomical object (e.g., the sun, the moon, stars) and the horizon (or skyline) for the purposes of celestial navigation. The determination of the angle, or altitude, can be referred to as sighting the object. The angle, in addition to the time at which the angle is measured, can be used to calculate a position line on a nautical or aeronautical chart. A sextant can be commonly used to sight the sun or other stars to determine latitude. In addition, the sextant can be used to measure the lunar distance between the moon and another celestial object (e.g., a star or planet) in order to determine Greenwich Mean Time, and hence longitude.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
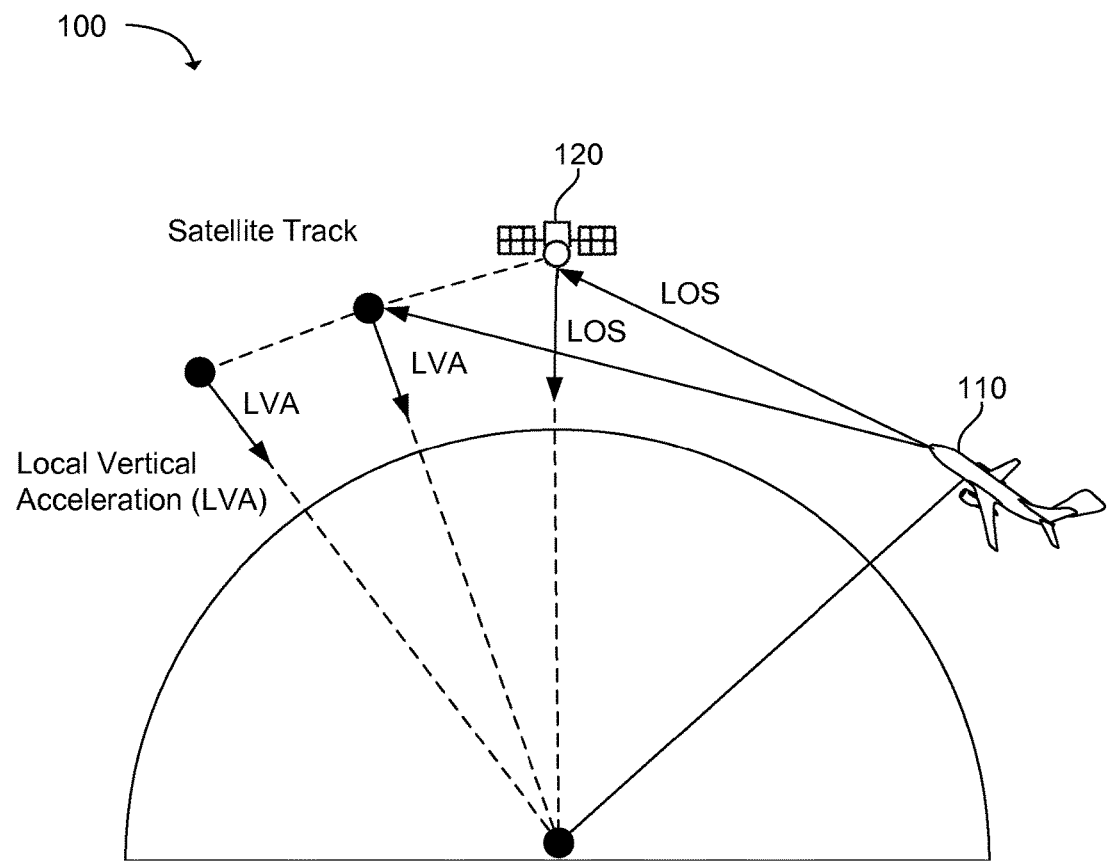
FIG. 1 illustrates a technique for determining a location of a horizon line using a sensor onboard a platform in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly and is not intended to identify key features or essential features of the technology, nor is it intended to limit the scope of the claimed subject matter.

A technology is described for determining a geolocation of a platform by synthesizing a set of differential measurements between a horizon line and a plurality of celestial objects (e.g., stars). The term "differential measurements" can be used interchangeably herein with the term "differential angular measurements." The platform can include an airborne platform, such as an aircraft (e.g., helicopter, airplane, UAV, etc.). The platform can include a sensor, such as an electro-optical infrared (EO/IR) sensor. A location of the horizon line can be determined using the sensor. The horizon line can include an actual horizon line or a synthesized (or artificial) horizon line. When the horizon line is synthesized, the horizon line is estimated by observing a satellite on its ballistic orbit. In one example, the satellite can include a Low Earth Orbit (LEO) satellite using the sensor. In addition, the synthesized horizon line can be determined without having accurate ephemerides of the satellite. As a result, all-weather, passive, absolute navigation of the platform can be enabled in a global positioning system (GPS)-denied area over land or water.

For each celestial object, a single differential measurement can be synthesized from absolute measurements of the horizon line and the celestial object in the focal plane (FP) at different time points. In other words, for each time point, an elevation (or angle) of the celestial object over the horizon line can be determined. With respect to the celestial object, multiple differential measurements can be identified for multiple time points. The multiple differential measurements that characterize the elevation of the celestial object over the horizon line over a period of time can be synthesized into the single differential measurement. This process can be repeated for each celestial object. Thus, line-of-sight (LOS) pointing of the sensor can be switched between the celestial objects in order to obtain the differential measurements for each celestial object.

In one example, at least five celestial objects (e.g., five stars) can be observed and tracked in order to determine the geolocation of the platform. Based on the five celestial objects, five differential measurements can be derived. The five differential measurements can correspond to five parameters that are to be estimated in order to determine the platform's position. These five parameters include three geolocation parameters for latitude, longitude and altitude, and two bias parameters for azimuth and elevation. Thus, the five differential measurements can be used to compute, or "look up," the platform's location.

The sensor's inertial measurement unit (IMU) can measure relative changes in angular measurements at different time points. The platform's inertial navigation system (INS) can measure relative changes in the platform's position to relate measurements at different times. The sensor IMU and the platform INS can link these highly-accurate, but separated in time, differential measurements together to form a set of differential measurements for multiple stars and frames. In particular, a Kalman filter can fuse the differential measurements, along with the measurements from the sensor IMU and the platform INS, over multiple stars and frames. Thus, the Kalman filter can process both the optical measurements and the inertial measurements. The set of differential measurements can be used to look up the platform's location. In particular, a longitude, latitude, and altitude of the platform can be determined based on the set of differential measurements. The use of differential measurements between the horizon line and the celestial objects can provide GPS-like (or better) accuracy in absolute positioning.

The present technology for determining the geolocation of the platform using the differential measurements can be referred to as a synthetic digital sextant (SDS). SDS is a modern incarnation of the classic sextant. The classic sextant, which is a handheld tool, proved to be a very effective navigational device over centuries because it is based on measuring a differential value (i.e., the elevation of a celestial object over the horizon at a known time). The celestial object can include the sun, moon or other stars in the sky. In the classic sextant, all LOS biases and jitters are effectively cancelled out due to simultaneous object/horizon measurements. In the classic sextant, the differential object-horizon measurement is enabled by optical design via the use of a half-silvered horizon mirror for beam splitting.

The SDS can provide GPS-like accuracy due, in part, to a higher angular resolution of the EO/IR sensor in ultra-narrow and narrow field of view (FOV) as compared to the classic sextant (in wide FOV and with a low angular resolution).

Numerous approaches have been previously proposed for performing navigation in the absence of GPS. These approaches are based on different principles: (1) radio frequency (RF) like GPS itself; (2) magnetic-field maps; (3) visible/infrared optical feature flow; (4) synthetic aperture radar (SAR) feature flow; (5) star-field tracking; and (6) classic sextant.

A first capability desired for navigation systems is the ability to geolocate the platform in absolute space. The RF, magnetic-field and classic sextant approaches provide absolute navigation, while other approaches (e.g., optical/SAR-feature flow and star tacking) only provide a mechanism for bounding INS drifts for relative navigation from a known absolute position to a GPS-denied area. In contrast, the SDS approach provides absolute navigation over land and water.

A second capability desired for navigation systems is the ability to provide high navigation accuracy. In the past, GPS provided the most accurate global positioning. Other approaches (e.g., based on the magnetic field anomalies) are aimed only at providing accuracy that is sufficient to arrive at the target of interest and then activate other sensors for more accurate navigation. SDS significantly improves the accuracy of the classic sextant by utilizing the full potential of a modern high-resolution imaging sensor. SDS's absolute positioning accuracy equals that of GPS and is better for some operational modes.

A third capability desired for navigation systems is the ability to perform all-weather navigation. The magnetic and SAR approaches, as well as GPS, provide this capability. In the past, optical sensors (e.g., EO/IR sensors) could not provide all-weather navigation, e.g., on a cloudy/foggy day. SDS can perform navigation when the airborne platform is above the clouds by observing multiple stars and a single LEO satellite. The observation of the LEO satellite can enable a location of the horizon line to be synthesized, as if the horizon line is measured on a perfect cloudless day and any terrain features (e.g., when the airborne platform is over land) are removed.

SDS is a single sensor solution to celestial navigation which utilizes the main-mission EO/IR sensor to measure multiple stars, a LEO satellite and the horizon in the same focal plane (FP) at different points in time. SDS utilizes a single LEO satellite for synthesizing the horizon line location without the need to estimate the precise satellite's trajectory in absolute coordinates. SDS provides all-weather absolute navigation with at least GPS-like accuracy. SDS can provide a substitute/alternative to GPS with the full capabilities of GPS to a single user (e.g., a carrier of the EO/IR sensor). In addition, SDS is passive and cannot be jammed. Therefore, platforms can penetrate Anti-Access/Area-Denial (AA/AD) areas at a high altitude/speed with the ability to geolocate not only itself but also non-cooperating targets.

FIG. 1 illustrates an exemplary technique for determining a location of a horizon line using a sensor onboard a platform 110 (e.g., an aircraft). The location of the horizon line can be used in conjunction with the location of celestial objects to form differential measurements that can be used for determining the platform's position. In one example, the horizon location can be synthesized from observations of a satellite 120. For example, the sensor onboard the platform 110 can observe the satellite 120, such as a Low Earth Orbit (LEO) satellite, over a period of time and then determine a synthesized horizon line. In this example, the synthesized horizon line is an artificial horizon line, rather than an actual horizon line. The sensor can be an electro-optical infrared (EO/IR) sensor. When the horizon line is synthesized, the sensor onboard the platform 110 can be used for celestial navigation (i.e., the use of angular measurements between stars and the horizon to determine position) irrespective of weather when the platform 110 is above the clouds. Thus, the synthesized horizon can be observed even with clouds, fog, refraction, terrain, etc.

In one example, the horizon can be synthesized in two steps: (1) synthesizing a local vertical for the platform 110; and (2) using knowledge of the local vertical to synthesize the horizon location. As shown in FIG. 1, the first step can be performed by observing the single satellite 120 (e.g., the LEO satellite) on its ballistic orbit over a period of time. In other words, the satellite 120 can be observed along its satellite track. The EO/IR sensor onboard the platform 110 can take line-of-sight (LOS) focal plane measurements, and based on these measurements, the satellite's positions in the sensor's coordinate system can be estimated to a sub-pixel accuracy. Based on the satellite's position estimates, an estimate of the satellite's acceleration vector can be calculated. The acceleration vector can also be referred to as a local vertical acceleration (LVA) vector, or simply a local vertical. The local vertical of the satellite 120 is a three-dimensional vector that is always pointed down to the center of the Earth. Since a ballistic object (e.g., the satellite 120) accelerates only along its local vertical, the local vertical for the satellite 120 can be transformed to a local vertical of the platform 110. With respect to the second step, for a given platform's position and known Earth radius or curvature, an angle between the local vertical of the platform 110 and the horizon can be calculated. In other words, the EO/IR sensor can construct an artificial horizon by identifying the local vertical of the satellite 120, and then rotating the satellite's local vertical to that of the platform 110. The local vertical of the satellite 120 can be rotated, using knowledge of the Earth's surface and curvature, to where the sensor is on the platform 110. The platform's local vertical is another geodetic feature that can be used for celestial navigation.

Thus, the horizon line location can be accurately reconstructed by observing a single LEO satellite 120 in its ballistic orbit. In other words, the horizon line location can be synthesized (or drawn) by observing the single LEO satellite 120 in its ballistic orbit. The satellite's positions in the sensor's coordinate system can be estimated. The horizon synthesis is based on the ballistic object (i.e., the satellite 120) in orbit accelerating only along its local vertical. The local vertical for the satellite 120 can be transformed into the location of the platform's local vertical, and then into the location of the horizon line around the platform 110. The local vertical for the satellite 120 can be transformed to the local vertical of the platform 110, which means knowing the horizon line. The observation of the synthetic horizon drawn by the satellite 120 uses the roundness or curvature of the Earth's gravity field, even though some corrections due to geoid apply. In addition, using the synthetic horizon line can be advantageous because the satellite's ephemerides do not need to be accurately known.

In an alternative example, the location of the horizon line is that of an actual horizon line. The EO/IR sensor can take measurements of the horizon line in a sensor focal plane, and based on these measurements, the location of the actual horizon line can be estimated. The observation of the actual horizon is based, in part, on the roundness or curvature of the Earth. However, observation of the actual horizon line can be difficult due to cloud cover, weather, etc. The actual horizon can be measured at any azimuth point where there are no clouds, but not necessarily directly under a star as required by the classic sextant.

As explained in detail below, differential angular measurements between the horizon line (i.e., the actual horizon or the synthetic horizon) and celestial objects in the sky can be determined over a duration of time, and the position of the platform 110 can be determined based on these differential angular measurements.

Figure 2:
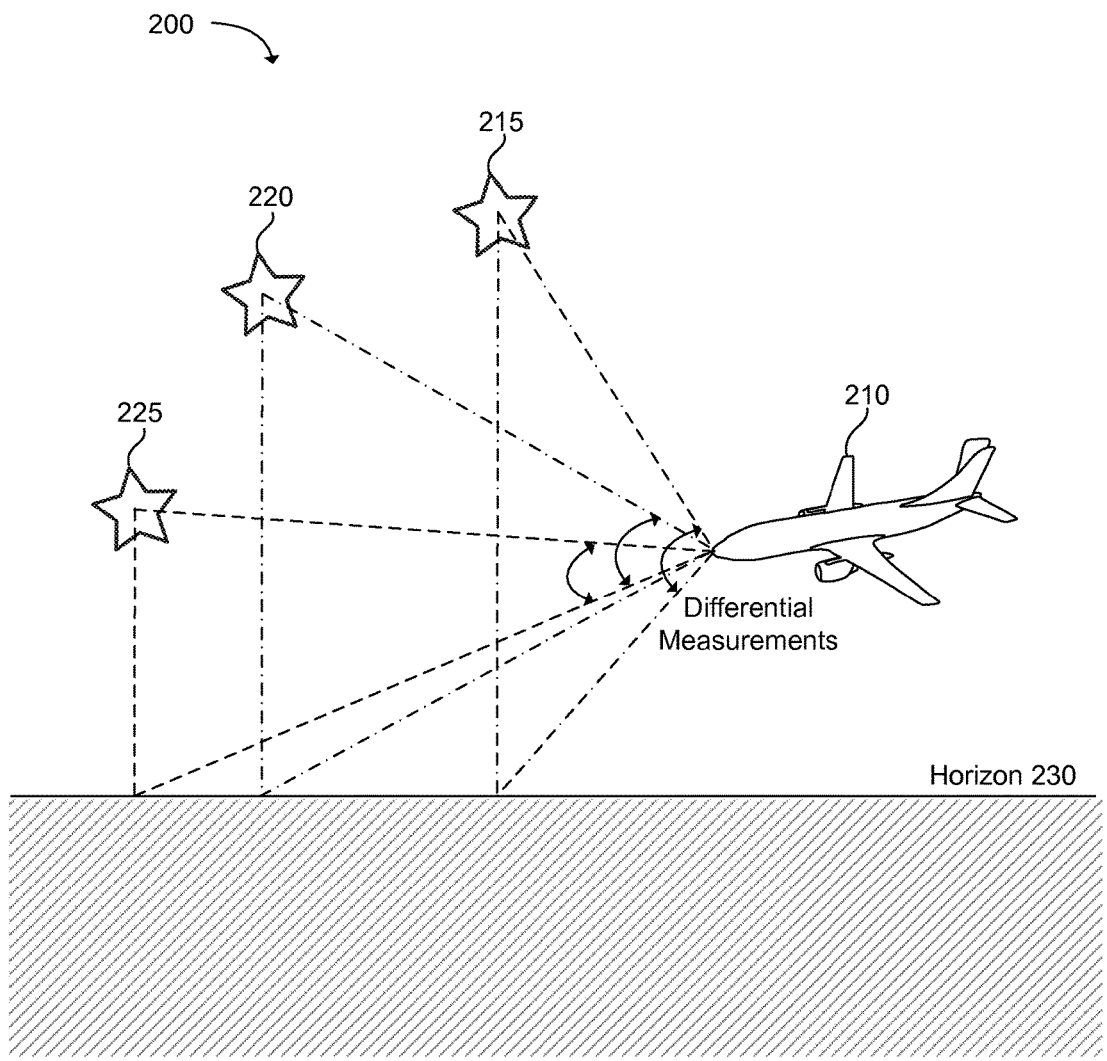
FIG. 2 illustrates a technique for determining differential angular measurements between a horizon line and celestial objects at known locations in the sky over a duration of time in accordance with an example.

FIG. 2 illustrates an exemplary technique for determining differential angular measurements between a horizon line 230 and celestial objects 215, 220, 225 at known locations in the sky over a duration of time. The differential angular measurements can be used to determine a position of a platform 210, such as an airborne platform. In one example, a system operable for determining the position of the platform 210 can be referred to as a synthetic digital sextant (SDS). The position of the platform 210 can include a latitude, longitude and altitude of the platform 210. In this case, the celestial objects 215, 220, 225 can be stars in the sky, but the celestial objects 215, 220, 225 can also include the sun, the moon, satellites, space debris, etc. The celestial objects 215, 220, 225 can have known reference points. In one example, geolocation of the platform 210 can be performed in approximately 1-2 minutes. In addition, no signals are sent from the platform. Rather, the platform's location is determined based on measurements of the celestial objects 215, 220, 225. The ability to geolocate using solely celestial object measurements can be useful if the platform 210 is in a GPS-denied environment.

The platform 210 can include a sensor, such as an electro-optical infrared (EO/IR) sensor. The sensor can have a large aperture, thereby possessing high angular resolution capabilities. For each celestial object 215, 220, 225, the sensor can take a series of position measurements over a period of time, and as a result, a fine track can be developed for each of the celestial objects 215, 220, 225. As previously explained, the horizon line 230 can be previously determined using the sensor onboard the platform 210. The horizon line 230 can be an actual horizon line or a synthetic horizon line. Due to the narrow field of view (FOV) of the sensor, the horizon line 230 and the celestial object 215, 220, 225 cannot be measured simultaneously, but the narrow field of view leads to improved accuracy.

The sensor can measure an elevation of each celestial object 215, 220, 225 over the horizon line 230 at multiple time points. In other words, for each time point, an elevation of the celestial object 215, 220, 225 over the horizon line 230 can be determined. The measured elevation (or angle) between a celestial object in the sky and the horizon line 230, from the perspective of the sensor, is referred to as a differential measurement. The differential measurement can also be referred to as the angular difference between the celestial object and the horizon line 230. With respect to each celestial object 215, 220, 225, multiple differential measurements can be identified for multiple time points. The multiple differential measurements that characterize the elevation of each celestial object 215, 220, 225 over the horizon line 230 over a period of time can be synthesized into a single differential measurement. Therefore, multiple differential measurements taken over time for a particular celestial object can be combined together as if taken by the sensor simultaneously.

A synthesized differential measurement can be calculated for each celestial object 215, 220, 225. In addition, the platform 210 can include an inertial navigation system (INS) and the sensor can include an inertial measurement unit (IMU). The sensor's IMU can measure relative changes in angular measurements at different time points. In other words, the IMU can accurately measure an angle change between observing a first celestial object 215 and observing a second celestial object 220. The platform INS can measure relative changes in the platform's position to relate measurements at different times. The sensor IMU and the platform INS can link these highly-accurate, but separated in time, measurements together to form a set of differential measurements for multiple celestial objects 215, 220, 225 and frames. In other words, the measurements from the sensor IMU and the platform INS can be used for bookkeeping when the set of differential measurements are determined. The differential measurements obtained by the sensor can be combined in space and time. The IMU can enable the synthesis of measurements over multiple celestial objects and over multiple time points. In one example, at least five celestial objects (e.g., five stars) may be observed and tracked in order to determine the geolocation of the platform 210. The differential measurements for the five celestial objects can be synthesized, linked and digitally fused in space and time.

As an example, the sensor onboard the platform 210 can be pointed at the first celestial object 215. The sensor can measure differential angular measurements between the first celestial object 215 and the horizon line 230 (which is previously calculated) over multiple time points. In other words, the sensor can take a series of differential angular measurements for the first celestial object 215 over a period of time. The sensor can then be pointed at the second celestial object 220. The line-of-sight (LOS) pointing can be switched when the sensor is pointed towards the second celestial object 220. The sensor can measure differential angular measurements between the second celestial object 220 and the horizon line 230 over multiple time points. The sensor can then be pointed at a third celestial object 225. Similarly, the sensor can measure differential angular measurements between the third celestial object 225 and the horizon line 230 over multiple time points. The sensor IMU can measure relative changes in angular measurements at different times and the platform INS can measure relative changes in the platform's position over time. For example, the sensor IMU can measure the angle change when the sensor is rotated from pointing to the first celestial object 215 to pointing to the second celestial object 220. Similarly, the sensor IMU can measure the angle change when the sensor is rotated from pointing to the second celestial object 220 to the third celestial object 225. The optical measurements from the sensor and the inertial measurements from the IMU and INS can be linked together to synthesize a set of differential measurements for all three celestial objects 215, 220, 225. In one example, the differential measurements for the celestial objects 215, 220, 225 can be performed in any sequence or direction.

In one example, a Kalman filter can fuse the differential measurements, along with the measurements from the sensor IMU and the platform INS, over multiple stars and frames. Thus, the Kalman filter can process both the optical measurements and the inertial measurements. The set of differential measurements can be used to look up the platform's location. In particular, a longitude, latitude, and altitude of the platform 210 can be determined based on the set of differential measurements. The use of differential measurements between the horizon line 230 and the celestial objects 215, 220, 225 can provide GPS-like (or better) accuracy in absolute positioning. The navigational accuracy can be further improved with higher pixel resolution and less drift errors in the INS and IMU. In past solutions, weather (e.g., clouds or fog) could limit the use of the sensor onboard the platform 210 when performing absolute navigation, but the use of the synthetic horizon can remove this limitation. In addition, a high altitude/speed platform can penetrate an Anti-Access/Area-Denial (AA/AD) area in any weather with the ability to navigate in the area without GPS, but with GPS-like accuracy.

In one example, the set of differential measurements can be projected into an invariant linear-subspace in which line-of-sight (LOS) biases in azimuth and elevation (at a specified time) can be canceled out. Subsequently, the Kalman filter, or a Kalman-type filter, can be used to process invariant measurements, as well as the inertial measurements from the IMU and INS, over multiple celestial objects 215, 220, 225 and frames, thereby yielding an accurate estimate of the platform's position. Thus, the invariant-subspace of the differential measurements (i.e., star-to-horizon measurements) can be formed, in which the platform's location (i.e., latitude, longitude and altitude) is still observable, but the LOS biases (i.e., azimuth and elevation) are effectively canceled out.

In one example, atmospheric refraction effects can be mitigated via the use of a differential pattern of celestial objects 215, 220, 225. The sensor can measure the relative angles between pairs of celestial objects 215, 220, 225, and the sensor IMU can measure the relative angular changes. Based on actual angular separations of celestial objects 215, 220, 225 that are retrieved from a catalog, the refraction effects can be estimated (relatively to the less-refracted celestial object) and then extrapolated to the horizon line 230. As an example, the sensor can measure the relative angle between the first celestial object 215 and the second celestial object 220, the first celestial object 215 and the third celestial object 225, and the second celestial object 220 and the third celestial object 225. The sensor IMU can measure angular changes when pointing the sensor from the first celestial object 215 to the second celestial object 220, and then from the second celestial object 220 to the third celestial object 225. The angular changes can be compared to the stored values in the catalog, wherein the catalog can include known angular changes between selected celestial objects. Based on differences between measured angular changes and actual angular changes in the catalog, the refraction effects can be estimated and then compensated for by extrapolating the refraction effects to the horizon line 230.

The effect of atmospheric refraction on the line of sight (LOS) of the sensor can be one source of error when using the differential measurements to determine the location of the platform 210. Since the light from the celestial objects 215, 220, 225 can be bent, an additional error is introduced that has to be removed when determining the absolute point to a satellite or a celestial object (e.g., a star). The differential measurements can be used to calibrate out the atmospheric refraction effects on the line of sight. Based on the catalog, a known angular difference between celestial objects can be identified. If the measured angular difference varies from the known angular difference, then this difference can be attributed to atmospheric refraction.

In one example, one type of error that results from using a sensor and pointing its line-of-sight (LOS) is referred to as a bias error. If a measurement location is taken of the first celestial object 215, there can be a bias error in the estimated location of the first celestial object 215. If the sensor is then pointed to observe the second celestial object 220, that same bias error can be found in the measurement location of the second celestial object 220. When a differential measurement is formed by subtracting the two measurement locations, the bias error can get cancelled out. Therefore, in order to perform absolute navigation, rather than only using absolute measurements to the celestial objects 215, 220, 225, angular differences between the celestial objects 215, 220, 225 (e.g., angular differences between pairs of celestial objects), as well as angular differences between the celestial objects 215, 220, 225 and the horizon line 230, can be utilized.

In one example, at least five differential measurements are used to estimate the platform's position. In other words, five parameters can be estimated in order to determine the platform's position. These include three geolocation parameters for latitude, longitude and altitude, and two bias parameters for azimuth and elevation. The azimuth and the elevation are bias errors, as described earlier. Thus, the platform's position can be determined based on solving the following five equations with five unknowns:

$$\begin{pmatrix} \Delta\delta_1 \\ \Delta\delta_2 \\ \Delta\delta_3 \\ \Delta\delta_4 \\ \Delta\delta_5 \end{pmatrix} = \begin{pmatrix} H_d\cos(\alpha_1) & H_d\sin(\alpha_1) & H_h & \vdots & H_{b1}(\alpha_1) & H_{b2}(\alpha_1) \\ H_d\cos(\alpha_2) & H_d\sin(\alpha_2) & H_h & \vdots & H_{b1}(\alpha_2) & H_{b2}(\alpha_2) \\ H_d\cos(\alpha_3) & H_d\sin(\alpha_3) & H_h & \vdots & H_{b1}(\alpha_3) & H_{b2}(\alpha_3) \\ H_d\cos(\alpha_4) & H_d\sin(\alpha_4) & H_h & \vdots & H_{b1}(\alpha_4) & H_{b2}(\alpha_4) \\ H_d\cos(\alpha_4) & H_d\sin(\alpha_5) & H_h & \vdots & H_{b1}(\alpha_5) & H_{b2}(\alpha_5) \end{pmatrix} \begin{pmatrix} \Delta\varphi \\ \Delta\lambda \\ \Delta h \\ \ldots \\ \Delta b_1 \\ \Delta b_2 \end{pmatrix}$$

Three parameters (i.e., latitude, longitude and altitude) can be estimated and two parameters (i.e., the LOS biases of azimuth and elevation) can be cancelled out.

Although using five celestial objects can provide faster convergence to the platform's geolocation, in some cases, more or less than five celestial objects can be used. For example, a single celestial object could theoretically be used, but conversion of the geolocation would take an increased amount of time because the single celestial object would have to be tracked across the sky. Using less than five celestial objects may also result in an increased error, or reduced accuracy, with respect to the calculated geolocation. Irrespective of the number of celestial objects that are used, it is important to form differential measurements between the celestial objects and the synthesized horizon in order to cancel out the LOS biases. An improved technique for exploiting the narrower field of view of the sensor is to take two measurements (i.e., a first measurement of the synthetic horizon and a second measurement of the celestial object) and differentiating them, because in this case, the biases can be canceled out since the bookkeeping is being performed by the sensor IMU.

In one example, the sensor onboard the platform 210 can serve a dual purpose. The sensor can be used for a main mission related to surveillance and target geolocation. In addition, the sensor can be used for GPS-denied absolute navigation of the platform 210. Thus, the platform 210 can geolocate itself, as well as non-cooperating targets that are being observed by the platform 210. The ability to perform geolocation in a reduced amount of time is important so that the sensor can perform the main mission. A compromise can arise between the accuracy of the navigation solution and the amount of time need to perform the main mission. In other words, a more accurate navigation solution can require an increased amount of time to collect the differential measurements, but at the expense of performing the main mission (e.g., geolocating targets). Therefore, the geolocation functionality can be mixed with the main mission function of the sensor.

Figure 3A:
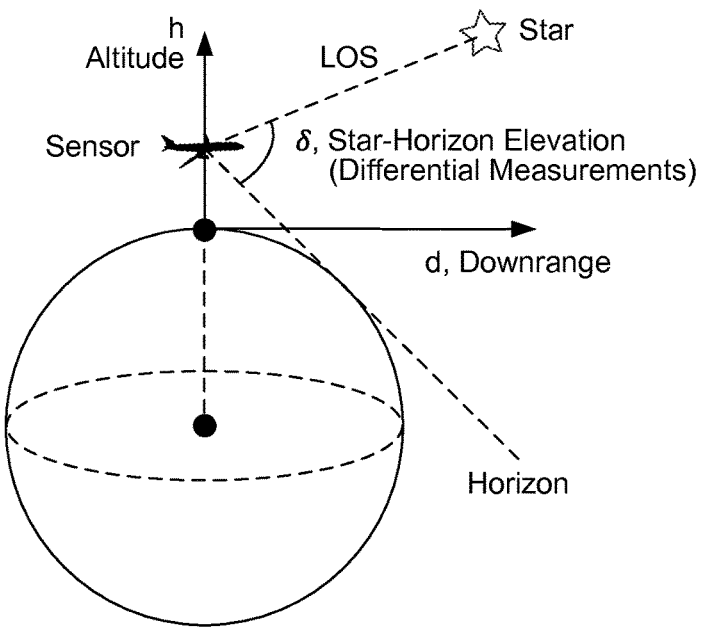
FIGS. 3A and 3B illustrate a technique for determining differential angular measurements between a horizon line and a plurality of celestial objects in the sky in accordance with an example.

FIG. 3A illustrates an exemplary technique for determining a differential angular measurement between a horizon line and a star in the sky. A sensor onboard an aircraft can be pointed towards the star, such that the sensor is within a line of sight (LOS) of the star. The sensor can determine the differential angular measurement between the star and the horizon line, also referred to as a star-horizon elevation. The location of the horizon line (i.e., synthetic or actual) can be previously determined by the sensor onboard the aircraft.

Figure 3B:
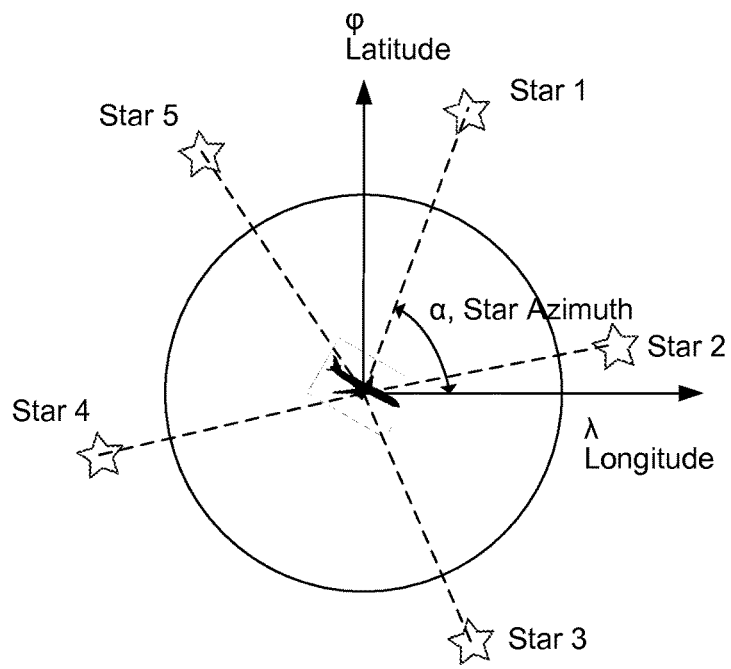

FIG. 3B illustrate an exemplary technique for determining differential angular measurements between a horizon line and a plurality of celestial objects in the sky. A sensor onboard an aircraft can be pointed towards a first star, such that the sensor is within a line of sight (LOS) of the star. The sensor can determine the differential angular measurement between the first star and the horizon line, which can be previously determined by the sensor onboard the aircraft. The sensor can be subsequently pointed towards the second star in order to determine the differential angular measurement between the second star and the horizon line. The sensor can perform similar steps to determine the differential angular measurements for the third star, the fourth star and the fifth star. A Kalman-type filter in an invariant three-measurement subspace can be linearly formed from the five differential angular measurements (that correspond to the five different stars). Three parameters can be used to estimate the latitude, longitude and altitude of the aircraft. Two parameters can be used to cancel LOS biases. In one example, variability in azimuths of five stars can improve position estimation accuracy. In addition, atmospheric refraction effects can be mitigated via subtraction along with the LOS biases.

Figure 4:
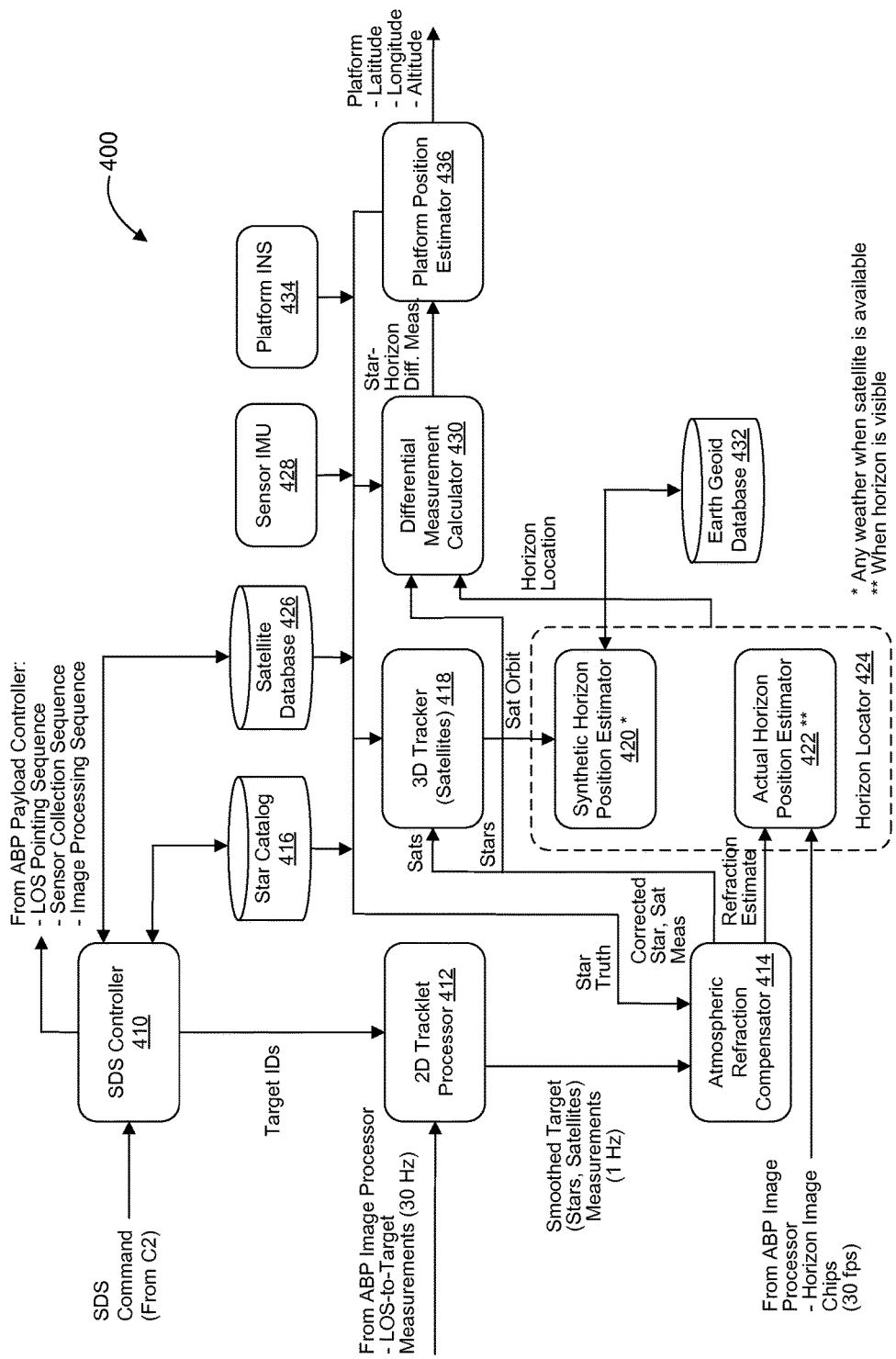
FIG. 4 illustrates an architecture of a system onboard a platform that is operable to determine a position of the platform in accordance with an example.

FIG. 4 illustrates an exemplary system 400 onboard a platform that is operable to determine a position of the platform. The system 400 can also be referred to as a synthetic digital sextant (SDS). The SDS is a novel capability for platforms (e.g., airborne platforms) that carry large-aperture, high resolution electro-optical infrared (EO/IR) sensors. These sensors can be part of the multi-spectral targeting system (MTS) class of high resolution sensors. The SDS capability can enable global positioning system (GPS)-quality geolocation of the platform (i.e., latitude, longitude and altitude of the system) in the absence of GPS. In one example, SDS can be utilized to perform navigation in GPS-denied environments.

When the platform activates an SDS mode, the high resolution EO/IR sensor can take a sequence of line of sight (LOS) measurements to a set of celestial objects (e.g., stars) and the Earth's horizon. The LOS measurements can be subsequently processed to synthesize differential celestial object-to-horizon measurements. These differential measurements can be similar to those measurements provided by a classical sextant, but with increased accuracy due to the high spatial resolution of the EO/IR sensor. The SDS can synthesize differential measurements from absolute measurements of the celestial objects and/or the horizon in a sensor focal plane. The differential measurements can be synthesized, such that the EO/IR sensor can measure the LOS locations of multiple celestial objects and the horizon with different slews of the EO/IR sensor field of view (FOV) over multiple points in time. In addition, sensor inertial measurement unit (IMU) metadata and platform inertial navigation unit (INU) metadata can be used to link the differential measurements to synthesize a set of differential measurements. The sensor IMU can measure relative changes in angular measurements at different times, and the platform INU can measure relative changes in the platform's position over time. The differential elevation measurements can be used to compute, or "look up" the platform's location. The differential aspect of the synthesized elevation measurements leads to the cancellation of sensor LOS and IMU bias errors, which can otherwise limit the SDS's geolocation accuracy.

One advantage of the SDS is that the location of the Earth's horizon can be directly measured with the EO/IR sensor. The horizon can be measured when cloud-free LOS to the horizon is available, or alternatively, the horizon can be synthesized from observations of a satellite, such as a Low Earth Orbit (LEO) satellite, made with the EO/IR sensor. The SDS horizon synthesis mode enables the EO/IR sensor to be used for all-weather celestial navigation when the platform is above the clouds. Therefore, the synthesized horizon can be observed irrespective of clouds, fog, refraction or terrain. In this case, celestial navigation can involve using the locations of the celestial objects (e.g., stars) with respect to the horizon line in order to determine the platform's position.

In one example, the differential measurements collected from the SDS can be used to track missile targets. The missile targets can be tracked during a specific phase of the missile (e.g., a post-boost phase) in a GPS-denied environment. In this case, the differential measurements can be made between the celestial objects (e.g., stars) and the missile targets. Thus, the SDS can utilize the same EO/IR sensor for missile target tracking, as well as for platform navigation. In addition, various other components of the SDS can be utilized for either missile target tracking, platform navigation, or a combination of both.

As FIG. 4 shows, an SDS mode of operation can be initiated. Based on the time and a current location of the platform, an SDS controller 410 can access a star catalog 416 and a satellite database 426, and then select a set of stars and a horizon location. In addition, the SDS controller 410 can select a LEO satellite if the SDS is operating in a synthetic horizon mode. The SDS controller 410 can compute a set of sensor line of sight (LOS) pointing, field of view (FOV) data collection and sensor data processing sequences. The SDS controller 410 can send these sequences to an airborne processor (ABP), or an electronics unit (EU), for subsequent execution of the search, acquisition and tracking of these targets. As the satellite and star targets are acquired and tracked, time-tagged star and satellite two-dimensional (2D) LOS-to-target data (30 samples per second) can be provided to a 2D tracklet processor 412 from the ABP/EU, where the data can be smoothed down to LOS tracklets (or tracks) at a rate of one sample per second. If the SDS operates in an actual horizon location mode, as opposed to the synthetic horizon mode, then focal plane image chips (at 30 fps) containing the horizon can be provided to a horizon locator 424.

The smoothed 2D tracklets for the star and satellite targets can be provided to an atmospheric refraction compensator 414, in which apparent star locations in the sensor data are compared to true star locations from the star catalog 416 to estimate atmospheric refraction errors. These estimates can be used to remove the atmospheric refraction errors in the 2D tracklets for the star and satellite targets. The atmospheric refraction error at the horizon can also be estimated and provided to the horizon locator 424, and then used to correct the actual horizon location.

The refraction-corrected satellite tracklets can be provided to the 3D tracker 418, in which the orbital parameters of the satellite are estimated. The satellite orbital parameters can be provided to the horizon locator 424, and in particular a synthetic horizon position estimator 420, in which the satellite local-vertical is computed and used to estimate the platform local-vertical. The platform local-vertical can be used to synthesize the horizon location.

The refraction-corrected star tracklets can be provided to a differential measurement calculator 430. The location of the horizon can be estimated in the horizon locator 424 (either an actual horizon or a synthetic horizon), and then be provided to the differential measurement calculator 430. The time histories of sensor position and LOS attitude during SDS sensor data collection, from a sensor inertial measurement unit (IMU) 428 and platform inertial navigation system (INS) 434, can also be provided to the differential measurement calculator 430 for correlation with the stellar and satellite track data. The star tracklet and horizon location (actual or synthesized), as well as the IMU and INS data, can be used to calculate the synthesized differential measurements. The synthesized differential measurements can be utilized in by a platform position estimator 436 to estimate a position of the platform. In particular, the platform position estimator 436 can estimate the latitude, longitude and altitude of the platform with at least GPS-quality accuracy. These highly accurate estimates can be used for navigation and to provide a feedback correction to the platform INS 434.

In one configuration, the SDS controller 410 in the SDS can interface with the platform command and control (C2), select and implement an SDS concept of operations (CONOPS) to be followed for a given SDS instantiation, initiate the set-up and execution of SDS operation, and reports status and results back to C2. The SDS controller 410 can receive an input command from the platform C2, which can include the required SDS start and stop times and a flag indicating which mode of horizon location is to be implemented (i.e., synthetic or natural horizon estimation). The decision on whether to determine the horizon location for a synthetic horizon or the actual horizon can be performed by an operator of the EO/IR sensor. If the natural horizon mode is initiated, an input command can include an azimuth interval from which the natural horizon is to be accessed by the EO/IR sensor.

The SDS controller 410 can access the star catalog 416 and the satellite database 426, if in the synthetic horizon mode, in order to select the available stars and a satellite (e.g., an LEO satellite) based on platform position, heading and time-of-day. Based on relative star, satellite and horizon locations, the SDS controller 410 can compute the set of sensor LOS pointing and collection and sensor data processing sequences necessary to support the specific SDS instantiation. If there are no LEO satellites available during the commanded SDS duration, the SDS controller 410 can define a collection sequence that consists of stars only, and the SDS algorithms can process only the star tracklet data. The specific SDS CONOPS selected will be reported to the C2. The resulting collection and processing sequences can be sent to the ABP/EU for implementation.

In defining the collection mode, the SDS controller 410 can specify the target sequence (stars, number of stars, satellite, horizon), the time-on-target for each target dwell, the degree of interleaving of different targets, the time between target dwells, the number of repeated collections against the different targets in the set and the interleaving of SDS operation with that of the sensor's main mission. For example, the sensor's main mission can be for missile target tracking, rather than for platform navigation. These SDS CONOPS parameters can be chosen to optimize SDS performance with respect to minimizing the time interval between successive sets of star and horizon (synthetic or natural), such that the sensor's IMU and the platform's INS drifts do not accumulate to large "bookkeeping" errors. In addition, the SDS controller 410 can include a rule-based decision tree, in which the rules and decision steps are pre-determined by prior analyses and studies, and are implemented in an if-then logical structure.

In one configuration, the 2D tracklet processor 412 in the SDS can smooth down the 30 samples/second 2D LOS-to-target data, outputted by the ABP/EU, to less noisy and more accurate one sample/second LOS-to-target tracklets. The 2D tracklet processor 412 can operate in a batch mode in that, for each target (e.g., stars, satellite), one second's worth of data (thirty samples of 2D LOS-to-target data) can be taken and outputted to a single smoothed 2D LOS-to-target tracklet. An estimate of the measurement noise associated with each tracklet can be computed. In addition to the non-causal smoothing, the 2D tracklet processor 412 can implement an outlier test on the incoming 2D LOS-to-target centroid data to eliminate or appropriately weight very noisy input data, and thereby increase robustness of the 2D tracker processor 412 to possible bad detections (outliers). As a result, the 2D tracker processor 412 can provide an improved accuracy of the resulting 2D tracklets.

In one example, the 2D tracklet processor 412 can be implemented as a second-order polynomial filter for smoothing the 2D target intensity centroids over time. Outlier rejection/mitigation can be implemented as an L-1/L-2 norm optimizer. The implementation of the L1/L2 norm optimizer is an iterative set of least-squares-fits over the thirty samples in the batch in which, after each iteration of least-squares, the resulting residuals are processed to produce a set of weights for the original thirty input measurements. The input measurements are weighted and the least-squares-fit is repeated with the weighted input measurements. This process can be repeated approximately five times to produce the final smoothed 2D tracklet output.

In one configuration, the atmospheric refraction compensator 414 in the SDS can estimate the refraction error as a function of sensor LOS azimuth and elevation. An open-loop refraction correction can be applied in the ABP via simple parametric models using measurements of atmospheric temperature and pressure available in the aircraft metadata. For high-altitude platforms, the refraction effects are significantly lower than those for the ground-based platforms. This approach can be applied for SDS while correcting the measured elevations for stars and LEO satellite(s).

Sextant-type differential measurements are a novel paradigm for mitigating atmospheric refraction effects to enable high accuracy platform geo-location in a GPS-denied environment. This paradigm is based on the use of differential patterns between pairs of stars. In inertial space, the actual relative angles between any two stars remain the same due to the absence of 3D parallax. However, the measured (or apparent) angles between the two stars can be distorted from their catalog values due to the difference in refraction bending at different star positions (in azimuth and, mainly, in elevation). By using the truth and apparent differential patterns, as well as the angles obtained via integrating the IMU gyroscope rates, the refraction error can be reduced to the error of a single star, which is referred to as a "leading star." The differences between the actual and apparent differential patterns can be calculated, and then the angular measurements integrated from the sensor IMU gyroscopes can be used to determine the relative refraction effect between stars. The "leading star" can be chosen as the star with the highest elevation, which can result in a small error in elevation and substantially no error in azimuth (due to an isotropic atmosphere within a small solid angle between the leading star and the local vertical). Differences in locations of set of pairs of stars can be used to least squares polynomial curve-fit a two dimensional (2D) function of refraction versus azimuth and elevation. This function can be used to interpolate or extrapolate the refraction compensations to the LEO satellite and actual horizon measurements. In one example, the estimate of atmospheric refraction at the horizon may not be as accurate as for that of the stars. However, this error propagates mostly into the estimate of platform altitude, as opposed to that of the platform's latitude and longitude.

In one example, the atmospheric refraction compensator 414 in the SDS can integrate the sensor IMU rates to determine the apparent angular differences between pairs of stars (e.g., baseline in five pairs of stars). The atmospheric refraction compensator 414 can access the star catalog 416 to determine true angular differences between the pairs of stars. In addition, the atmospheric refraction compensator 414 can perform a 2D least squares fit to the offsets between the apparent and true differences to generate a polynomial function of diffraction versus elevation and azimuth.

In one configuration, the 3D tracker 418 can develop a 3D track on satellites (e.g., LEO satellites) for the purpose of estimating the satellite's local vertical vector, which can be used to support synthetic horizon location estimation. The 3D tracker 418 can impose a ballistic target trajectory to produce a 3D track in the sensor's relative coordinate system. This provides high (sub-pixel) accuracy in estimating the relative satellite coordinates with respect to the sensor's position and orientation. However, these estimates can be biased in absolute space. Bias can occur due to uncertainties in the LOS pointing, and the position of the sensor itself is unknown when navigation of the platform is being performed. This information is important for synthesizing the differential measurements (i.e., the star-horizon measurements). Correspondingly, in the differential sextant-type measurements, the LOS biases can be cancelled out and the measurements themselves can be highly accurate for estimating platform location.

The 3D tracker 418 can be implemented in Earth-centered inertial (ECI) coordinates, and can include six states to estimate: 3 positions and 3 velocities. A ballistic model is based on a simplified general perturbations (SGP4) propagator, but is simplified to a level sufficient for tracking satellites over short time intervals (e.g., on the order of minutes). In particular, the gravitational force-field can include zonal and longitudinal spherical harmonics of the Earth Gravitational Model 1996 (EGM-96) potential up to the fourth order. The measurement model for the 3D tracker 418 can be based on standard multi-spectral targeting system (MTS) models for projecting the 3D position of the target into the 2D focal plane (pixel measurements). This includes initialization of the LOS from the gimbal resolver angles and then using the IMU filter to track changes in the LOS over time. The initialization can provide two LOS biases at the start of the SDS window, which are subject to cancelling via the differential measurements.

In one example, the 3D tracker 418 is an extended Kalman filter (EKF) type filter with the dynamic and measurement models linearized in the vicinity of the current estimate. The Kalman-type filter can be optimized to handle model nonlinearities, or other filter types can be used, such as an unscented filter or a second order Gaussian filter.

In one example, the outcome of the 3D tracker 418 is a set of position/velocity estimates in the sensor's coordinate system, as well as associated covariances. The associated covariances can be used to characterize errors in the differential measurements. In addition, the 3D tracker 418 can determine whether the satellite is actually moving on a ballistic orbit without any external forces (e.g., due to thrust applied for orbit correction), as only vertically accelerating ballistic satellites can be used for estimating the local vertical. An interactive multiple model (IMM) filter can be used to check whether the satellite is moving on the ballistic orbit without any external forces. The IMM filter, as well as the ballistic model, uses a hypothesis that the model could include unknown accelerations. The maximum likelihood criterion can be used to estimate the probabilities of the two hypotheses (ballistic or non-ballistic).

In one example, the 3D tracker 418 can include an option for tracking multiple LEO satellites (when available), which can multiplicatively increase the dimension of the state and measurement vectors. This option, when staying within the computational capabilities of the ABP/EU, can significantly improve the convergence in the platform's geolocation.

In one configuration, the horizon locator 424 in the SDS can include the synthetic horizon position estimator 420, which can utilize 3D tracks of satellite targets from the 3D tracker 418 to synthesize the horizon location, and an actual horizon position estimator 422, which can utilize images containing the actual horizon that are collected with the EO/IR sensor. While it may be sufficient to use the synthetic local vertical for navigation, an additional transformation to the synthetic horizon can be performed because the synthetic horizon can be provided as input to the differential measurement calculator 430.

In one configuration, the synthetic horizon position estimator 420 can be utilized when a LEO satellite can be observed by the EO/IR sensor. The synthetic horizon position estimator 420 can be utilized independent of the cloud-cover conditions below the platform. The target satellite can be tracked by the 3D tracker 418, and the orbital parameters can be utilized in the synthetic horizon position estimator 420 to estimate the satellite's local vertical vector in the sensor coordinate system. The satellite's local vertical vector can be rotated in the sensor coordinate system to the location of the sensor. This can be accomplished by accessing an Earth geoid database 432 with both the satellite and sensor locations (e.g., latitude and longitude) in the sensor coordinate system to determine the rotation angle. With the resulting estimate of the sensor local vertical, the position of the horizon can be computed as a function of platform altitude. The synthetic horizon location along with the associated covariance information can be input to the differential measurement calculator 430.

In one example, the synthetic horizon position estimator 420 can perform the following: (1) compute the satellite local vertical directly from the 3D track parameters; (2) access the Earth geoid database 432 twice to determine the rotation angle between the satellite and the EO/IR sensor; (3) compute a direction cosine matrix based on the rotation angle between the satellite and the EO/IR receiver; (4) rotate the satellite local vertical to the sensor location; and (5) identify the local Earth radius from the Earth geoid database 432 and compute the synthetic horizon and associated covariances via an inverse cosine calculation.

In one configuration, the actual horizon position estimator 422 can be utilized when the Earth's horizon is visible (i.e., not totally obscured by cloud cover). Detection of the actual horizon can be accomplished by image processing of the sensor data based on spatial matched filtering. The spatial matched filtering exploits that the horizon will appear as a linear intensity gradient feature in the sensor image data as the observed background transitions from space/sky to Earth. Approximately thirty image chips (i.e., one second of sensor data) can be collected where the size of the image chips is made large enough to guarantee that the horizon is captured, based on approximate a priori position estimates. These image chips are then spatially registered to the pixel level using a straightforward maximum image-to-image correlation search. The resulting registered image stack is then averaged to produce an enhanced signal-to-noise (SNR) image containing the horizon. A spatial matched filter search can be carried across the enhanced image to locate the actual horizon position. The spatial matched filter mask to be used can be pre-selected from a pre-computed bank of horizon-matched filter masks that span a range of time-of-day and sensor LOS-Sun geometries. The elevation angle of the estimated horizon is then corrected for atmospheric refraction by the addition of the refraction estimate, which is provided by the atmospheric refraction compensator 414. The estimated actual horizon location can be provided to the differential measurement calculator 430.

In one example, the actual horizon position estimator 422 can perform the following: (1) spatial registration of the 30 input image chips by chip-by-chip convolution and select each image pair's maximum scoring registration; (2) average the 30 registered frames; (3) select the appropriate spatial matched filter mask from the a priori set based on time-of-day and Sun-sensor LOS geometry; (4) convolution of the matched filter mask with the SNR-enhanced frame; (5) select the maximum correlation as the estimate of the actual horizon; and (6) add the atmospheric refraction correction term.

In one configuration, the differential measurement calculator 430 in the SDS can synthesize the function of the conventional sextant. The SDS, due to its half silvered mirror beam splitter, can remain invariant to LOS biases and jitter while accurately measuring the relative (i.e., differential) angles between the stars and the horizon, which are sufficient for celestial navigation. Unlike the conventional sextant, SDS can synthesize the differential (i.e., star to horizon) measurements over time, i.e., when the star and horizon locations are measured at different time points. As previously discussed, the horizon can be an actual horizon or a synthetic horizon. The sensor IMU 428 and the platform INS 434 can provide the measurement information to link the star and horizon measurements in time, which may be referred to as a "book-keeping procedure." This procedure can enable reduction of a dynamic estimation problem to a static estimation problem within the SDS window, as defined by the SDS controller 410.

The static estimation problem is formulated based on Equation 1:

$$\underset{m \times 1}{y} = \underset{m \times n}{H} \underset{n \times 1}{x} + \underset{m \times l}{G} \underset{l \times 1}{v} + \underset{m \times 1}{\eta}$$

The measurement vector y of size [m×1] includes the m actual measurements ("measured star" or "measured horizon"), which are collected at different time points (at 1 Hz after smoothing). The right-hand portion of Equation 1 represents the "prediction" version of the measurements ("predicted star" or "predicted horizon"), which are linearized with respect to the state-vector x to be estimated and the vector of undesirable factors (θ) to be cancelled out. The state-vector x to be estimated has a size of [n×1]. When the horizon is actual, n=6, and the components of the state-vector x are the following: latitude, longitude and altitude of the platform as well as their rates. When the horizon is synthesized, n=6+6N where N is the number of observed LEO satellites. Correspondingly, the state-vector x includes 6 parameters (i.e., 3 position parameters and 3 velocities) for each satellite. These parameters along with their covariances are defined in the sensor's coordinate system and generated by the 3D tracker 418. The parameters are utilized because unlike the actual horizon which is measured instantaneously, the synthetic horizon is generated over time by tracking the LEO satellite(s) in 3D. Thereby, the satellites' coordinates are to be estimated only in the sensor's coordinate system, since the LOS biases will be cancelled out via the differential measurements. As previously discussed, the LOS biases can prevent accurate estimation of the absolute positions.

In one example, the state-vector x can be defined at the first time point of the SDS window, since the measured information is accumulated in time. Correspondingly, the next positions of the platform within the SDS window can be obtained by integrating the platform's INS data forward in time. The matrix H of size [m×n] represents all measurement-state partials (first-order derivatives) given the non-linear dynamics and measurement models. The vector of undesirable factors θ to be cancelled out has the size of [l×1]. In the simplest case l=2, the vector θ includes the following two components: bias in LOS azimuth and bias in the LOS elevation. In a more general case, the vector θ can be expanded by other parameters (e.g., those which characterize a linear portion of the IMU drifts). The vector of undesirable factors θ to be cancelled out can be defined at the beginning of the SDS window. Correspondingly, the next values of the biases (within the window) can be determined by integrating the sensor IMU 428 forward in time. The matrix G of size [m×1] represents the partials given all non-linear transformations. The vector η of size [n×1] is the Gaussian measurement noise with the zero mean, but with the non-diagonal covariance matrix $D_\eta$ of the size [m×m]. The sensor IMU 428 and the platform INS 434 have random drifts which are integrated in the "book-keeping procedure," resulting into correlated measurements. In other words, the static structure of the estimation problem is obtained at the expense of the correlated measurements. The corresponding non-diagonal covariance matrix can be derived given all input noise characteristics.

The subsequent step in solving the estimation problem of Equation 1 is to project the star and horizon measurements into an invariant subspace where the undesirable factors (θ) are cancelled out, but the state-vector x is still observable and can be estimated. Mathematically, the projection operator can be defined by Equation 2:

$$z = Sy = S(Hx + G\vartheta + \eta) = SHx + \underbrace{SG\vartheta}_{\text{to cancel out}} + S\eta,$$

where z is the vector of the invariant measurements (or differential measurements) of the size [m̃×1] and S is the projection matrix (invariant operator) of the size [m̃×m] where m̃≤m−1. The condition of invariance for the operator S is defined by Equation 3: SG=0. In other words, the system of linear equations has to be solved to obtain the invariant operator S.

There are multiple solutions to Equation 3 since the number of variables is larger than the number of equations. In one example, in the SDS window, the star and horizon (actual or synthetic) measurements can be split in a few independent groups with the equal number of both measurements. The "star-horizon" differential measurements can be formed by reweighting the "star" and "horizon" measurements, such that the vector of the undesirable factors θ is cancelled out. This solution is applicable when m̃=m/2. A single quasi-optimal solution can be obtained by maximizing the quadratic norm of the measurement sensitivities. This is a quadratic-linear optimization problem which can be solved analytically, as shown in Equation 4:

$$J = \|SH\|_2 \to \min_S$$

Unlike the conventional sextant, the differential measurements in SDS are synthesized with increased flexibility. In the conventional sextant, the elevation of star (or Sun) over horizon is measured simultaneously, which necessitates that the celestial body is directly above the measured horizon line. In SDS, the stars and horizon can be measured at different azimuths, which provides increased flexibility, e.g., to operate under conditions of partial cloudiness.

In one configuration, the platform position estimator 436 in the SDS can receive the synthesized differential measurements from the differential measurement calculator 430. The platform position estimator 436 can use the synthesized differential measurements to estimate the platform's geolocation and velocity. In particular, the platform position estimator 436 can estimate the latitude, longitude and altitude of the platform. The platform position estimator 436 can estimate the platform's geolocation with at least GPS-quality accuracy. The platform's geolocation can be estimated by solving Equation 2 written in a shorter form, as shown in Equation 5:

$$z = SHx + S\eta$$

When the actual horizon is used, the state-vector x to be estimated includes the 6 components: latitude, longitude and altitude as well as their rates. When the horizon is synthesized by observing a LEO satellite(s), the state-vector x also includes the 6 additional components: 3 positions and 3 velocities in the sensor's coordinates (for each satellite).

Equation 5 can be solved in a least-squares manner (L-2 norm) based on an estimate of the state-vector (x*) and the associated covariance matrix (P*), as shown in Equation 6:

$$\begin{cases} x^* = P^* \tilde{H}^T \tilde{D}_\eta^{-1} z \\ P^* = \left(\hat{P}^{-1} + \tilde{H}^T \tilde{D}_\eta^{-1} \tilde{H}\right)^{-1} \end{cases}$$

where $\hat{P}$ is the a priori covariance matrix for the state-vector x (with the zero mean since the nonlinear model is linearized in the vicinity of the current estimate). In addition, in Equation 6, the following notations are used: $\tilde{H}=SH$ and $\tilde{D}_\eta=SD_\eta S^T$ (due to the invariant transformation).

In one example, an additional L-1/L-2 norm optimization option can be added to increase robustness of the platform's position estimation. The L-1/L-2 norm optimization may have been previously applied at the 2D tracklet processor 412 for smoothing measurements in the focal plane. This step effectively handles outliers, for example, due to bad detections from frame to frame (at 30 Hz). However, the smoothed measurements at 1 Hz are also different at different times, particularly in their information content. In other words, there are more informative measurements (with sensitivity/noise characteristics) and the L-1/L-2 norm optimization automatically identifies the more informative measurements and weights them more than the less-informative measurements. Mathematically, this entails solving a system of Equation 6 iteratively, and at each step, the measurements are reweighted according to the L-1/L-2 optimization criterion.

In one example, the navigation solution is for a single window of SDS, in which the processing is performed in the batch mode, as described in the SDS controller 410. In general, SDS operates in the batch-recursive mode when generating the platform's position/velocity estimates and the associated covariance matrices in a sequence of the SDS windows (at the last time point of each). The generated estimate-covariance information from each window is fused recursively to generate the total estimate of the platform and associated covariance matrix at the end of the current window.

In one example, the set {x*(i), P*(i)} is the estimate-covariance output from the SDS at the end of the i-th window and the set {x*(i−1), P*(i−1)} is the output from the previous (i−1)-th window. The latter set can be predicted to the end of the i-th window by using the relative data from the platform INS 434 for the state-vector estimate and the drift statistical characteristics for the covariance matrix, as well as the satellite(s) dynamics if the horizon is synthesized. In particular, the latter set can be predicted using Equations 7 and 8, as shown below:

$$\begin{cases} x^*_{pred}(i) = A(i-1)x^*(i-1) + B\Delta x_{INS\ data} \\ P^*_{pred}(i) = P^*(i-1) + BD_{INS\ drift}B^T \end{cases} \quad (1)$$

-continued $$A(i-1) = \left(\begin{array}{c|c} I_{3\times 3} & 0_{3\times 6N} \\ \hline 0_{6N\times 3} & \frac{A^{sat}(i-1)}{6N\times 6N} \end{array}\right), B = \left(\begin{array}{c} I_{3\times 3} \\ 0_{6N\times 3} \end{array}\right)$$

where N is the number of LEO satellites.

As a result, the fused set $\{x^*_{fused}(i), P^*_{fused}(i)\}$ can be generated in accordance with Equation 9:

$$\begin{cases} x^*_{fused}(i) = P^*_{pred}(i)[(P^*_{pred}(i))^{-1}x^*_{pred}(i) + (P^*(i))^{-1}x^*(i)] \\ P^*_{fused}(i) = [(P^*_{pred}(i))^{-1} + (P^*(i))^{-1}]^{-1} \end{cases}$$

In one example, the recursive procedure can be repeated from one window to the next window, wherein the platform's positions and velocities are generated at the end of each window. Between the two windows, the navigation information is also accessible at each time via the predictions from the INS data (as formalized in Equation 7). In addition, the fusion of Equation 9 is equivalent to the recursive Kalman filter where the generalized measurement of the state-vector is formed via the batch processing in the specified window. As previously mentioned, the batch mode enables the synthesizing of sextant-type differential measurements that are free from LOS biases.

Figure 5:
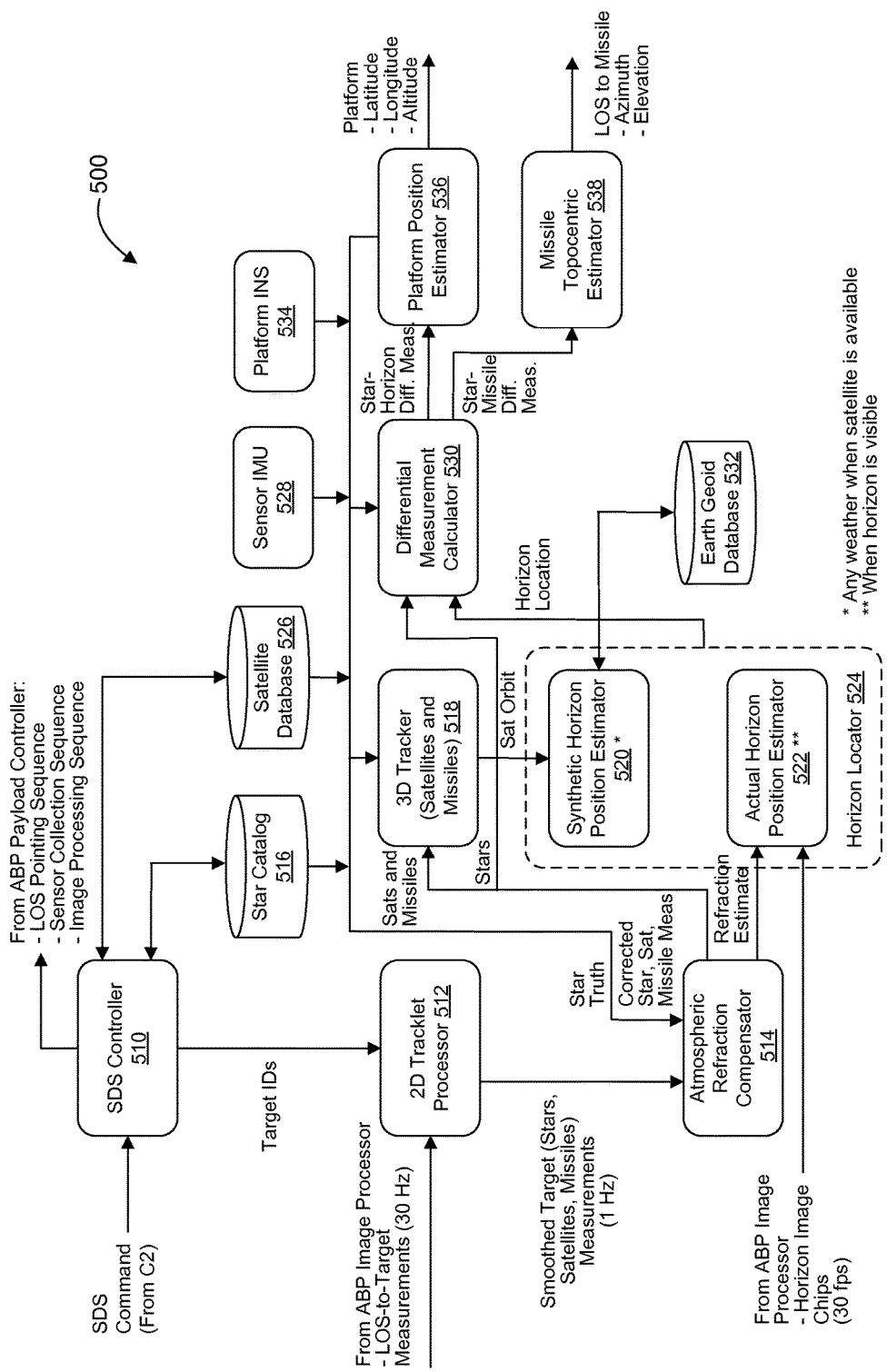
FIG. 5 illustrates an architecture of a system onboard a platform that is operable to perform object tracking in accordance with an example.

FIG. 5 illustrates an exemplary system 500 onboard a platform that is operable to perform object tracking. In particular, the system 500 can perform enhanced missile tracking. The system 500 can also be referred to as a synthetic digital sextant (SDS). Similar to FIG. 4, the SDS can include an SDS controller 510, a 2D tracklet processor 512, an atmospheric refraction compensator 514, a star catalog 516, a 3D tracker 518 (for satellites and missiles), a synthetic horizon position estimator 520 and an actual horizon position estimator 522 that are part of a horizon locator 524, a satellite database 526, a sensor IMU 528, a differential measurement calculator 530, an Earth geoid database 532, a platform INS 534 and a platform position estimator 536. As explained in further detail below, the SDS can also include a missile topocentric estimator 538. The SDS can improve missile tracking (including during multiple target raids) when GPS is denied or when GPS is available.

In one example, the presence of new targets (e.g., missiles) can be handled by the 2D tracklet processor 512 and the atmospheric refraction compensator 514. In this case, the missile 2D trajectories in the focal plane are smoothed and then corrected for the refraction effects similar to the satellite trajectories. The 3D tracker 518 can use the techniques described above (with respect to tracking a ballistic satellite) in order to track a missile in the ballistic phase (or multiple missiles in their ballistic phases).

In one example, when the missile is in its ballistic phase, the missile can be utilized to better geo-locate the sensor's platform (an additional indicator of the local vertical). Multiple missile raids further facilitate better platform geolocation. Reconstruction of the horizon from multiple satellite/missile observations can be performed in the synthetic horizon position estimator 520. The differential measurement calculator 530 can process the "star" and "horizon" measurements by estimating the platform's position (i.e., latitude, longitude and altitude) as well as the relative positions of the satellite(s) and missile(s) in the sensor's coordinate system. For the platform's navigation, those coordinates can be utilized in a convolved form (the estimate of the local vertical). However, over a period of time, the estimates of all coordinates converge in all directions, and the absolute satellite(s) and missile(s) positions and velocities can be reconstructed in the ECI by adding the relative estimates to that of the platform. However, in the CONOPS of missile tracking, 3D absolute reconstruction is unnecessary since a single airborne infrared (ABIR) platform outputs only the estimate of LOS to target(s), which includes azimuth and elevation in the topocentric system. The ultimate 3D fusion can be performed using the azimuth/elevation from multiple platforms.

As shown in FIG. 5, the missile topocentric estimator 538 can transform the estimates of the platform and missile(s) into the estimates of LOS (i.e., azimuth and elevation). These estimates will be maximally unbiased due to the use of the sextant-type differential measurements invariant to the LOS biases. In one example, the SDS can simultaneously perform platform geolocation and ballistic missile tracking, or alternatively, the SDS can either perform platform geolocation or ballistic missile tracking. Since the platform's latitude, longitude and altitude is known at each time point (from GPS), the convergence of the missile tracking process (in terms of generating the LOS estimates) will be significantly faster.

Figure 6:
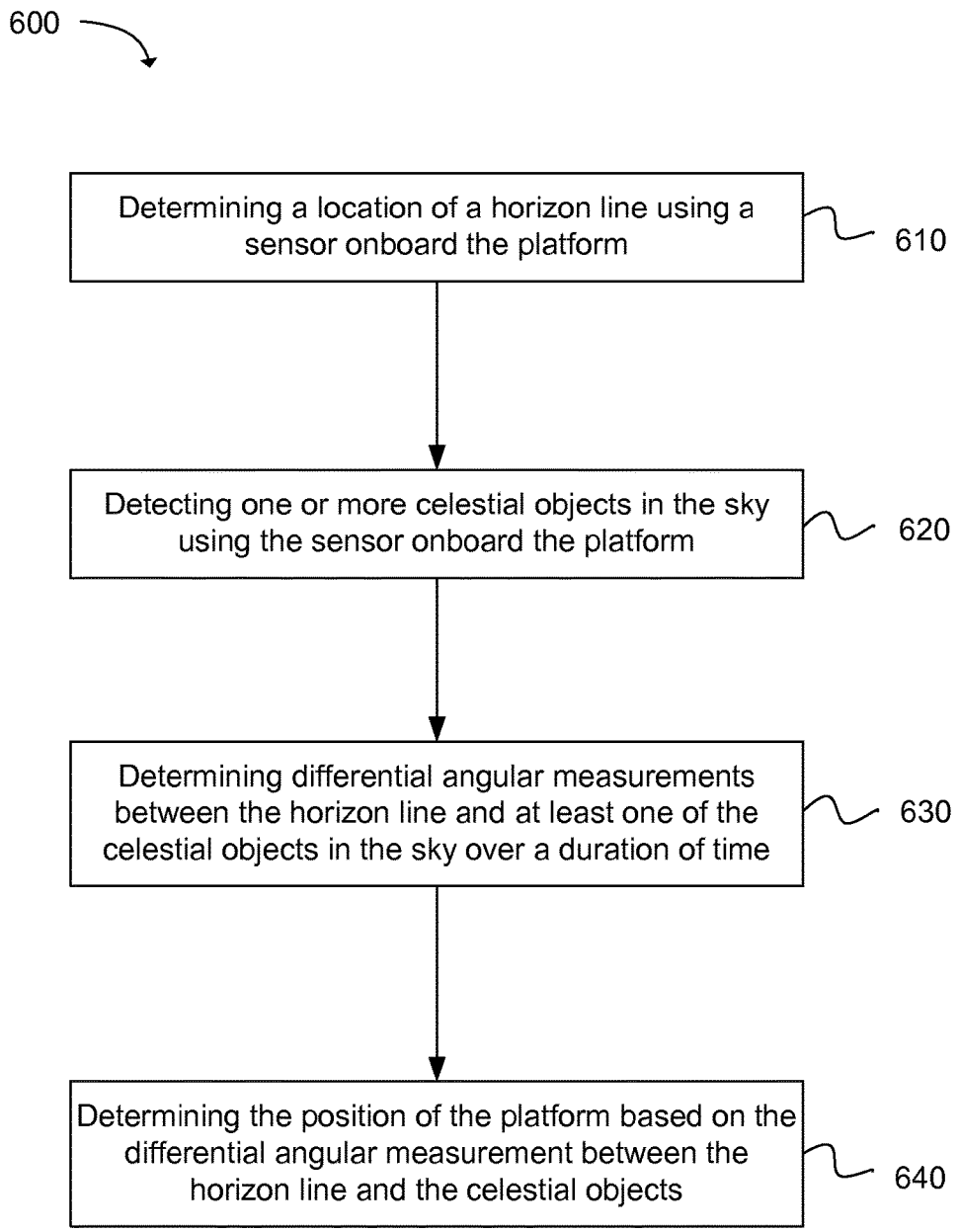
FIG. 6 depicts a flow chart of a method for determining a position of a platform in accordance with an example.

FIG. 6 depicts an exemplary flow chart 600 of a method for determining a position of a platform. The method can be executed as instructions on a machine, where the instructions are included on at least one computer readable medium or one non-transitory machine readable storage medium. The method can include the determining a location of a horizon line using a sensor onboard the platform, as in block 610. The method can include detecting one or more celestial objects in the sky using the sensor onboard the platform, as in block 620. The method can include determining differential angular measurements between the horizon line and at least one of the celestial objects in the sky over a duration of time, as in block 630. The method can include determining the position of the platform based on the differential angular measurement between the horizon line and the celestial objects, as in block 640.

In one example, the horizon line is an actual horizon line or a synthesized horizon line. In one example, the synthesized horizon line is produced by observing a satellite in its ballistic orbit.

In one example, the step of determining the location of the horizon line further comprises identifying a satellite in orbit using the sensor onboard the platform, the satellite including a Low Earth Orbit (LEO) satellite; estimating positions of the satellite along its ballistic orbit over a defined period of time; determining a local vertical acceleration (LVA) vector of the satellite based on position estimations of the satellite; transforming the LVA vector of the satellite to an LVA vector of the platform; and calculating an angle between the LVA vector of the platform and a horizon location based on a current position of the platform and a curvature of the Earth, wherein the horizon line is a synthesized horizon line.

In one example, the method can further comprise identifying a set of differential angular measurements between the horizon line and the celestial objects in the sky over the duration of time, wherein the set of differential angular measurements are used to determine the position of the platform.

In one example, the step of determining the set of differential angular measurements further comprises identifying a first celestial object in the sky using the sensor, wherein the sensor measures a position of the first celestial object over multiple time points; determining a first differential measurement of a first angular difference between the first celestial object and the horizon line, wherein position measurements of the first celestial object over the multiple time points in relation to the horizon line are used to derive the first differential measurement; identifying a second celestial object in the sky, wherein an inertial measurement unit (IMU) onboard the platform detects an angular measurement between the first celestial object and the second celestial object; determining a second differential measurement of a second angular difference between the second celestial object and the horizon line, wherein positional measurements of the second celestial object over multiple time points in relation to the horizon line are used to derive the second differential measurement; and forming a set of differential measurements for the celestial objects in the sky with respect to the horizon line, the set of differential measurements including the first differential measurement and the second differential measurement.

In one example, the method can further comprise comparing the angular measurement between the first celestial object and the second celestial object as detected by the IMU to a known angular separation between the first celestial object and the second celestial object; estimating a level of atmospheric refraction based on a difference between the angular measurement as detected by the sensor and the IMU and the known angular separation; and mitigating the level of atmospheric refraction by extrapolating atmospheric refraction effects to the horizon line.

In one example, the method can comprise using a Kalman filter to process the differential angular measurements, inertial navigation unit (INU) measurements from the platform, and inertial measurement unit (IMU) measurements from the platform in order to estimate the position of the platform.

In one example, the position of the platform is determined using at least five differential angular measurements with respect to at least five celestial objects and the horizon line. In one example, the method can further comprise deriving three position parameters and canceling out two line of sight (LOS) bias parameters using the differential angular measurements, the three position parameters including latitude, longitude and altitude and the two LOS bias parameters including elevation and azimuth. In one example, the sensor is an electro-optical infrared (EO/IR) sensor. In one example, the platform is an airborne platform. In one example, the celestial objects detected using the sensor onboard the platform include at least one of stars, space debris, satellites or the moon.

Figure 7:
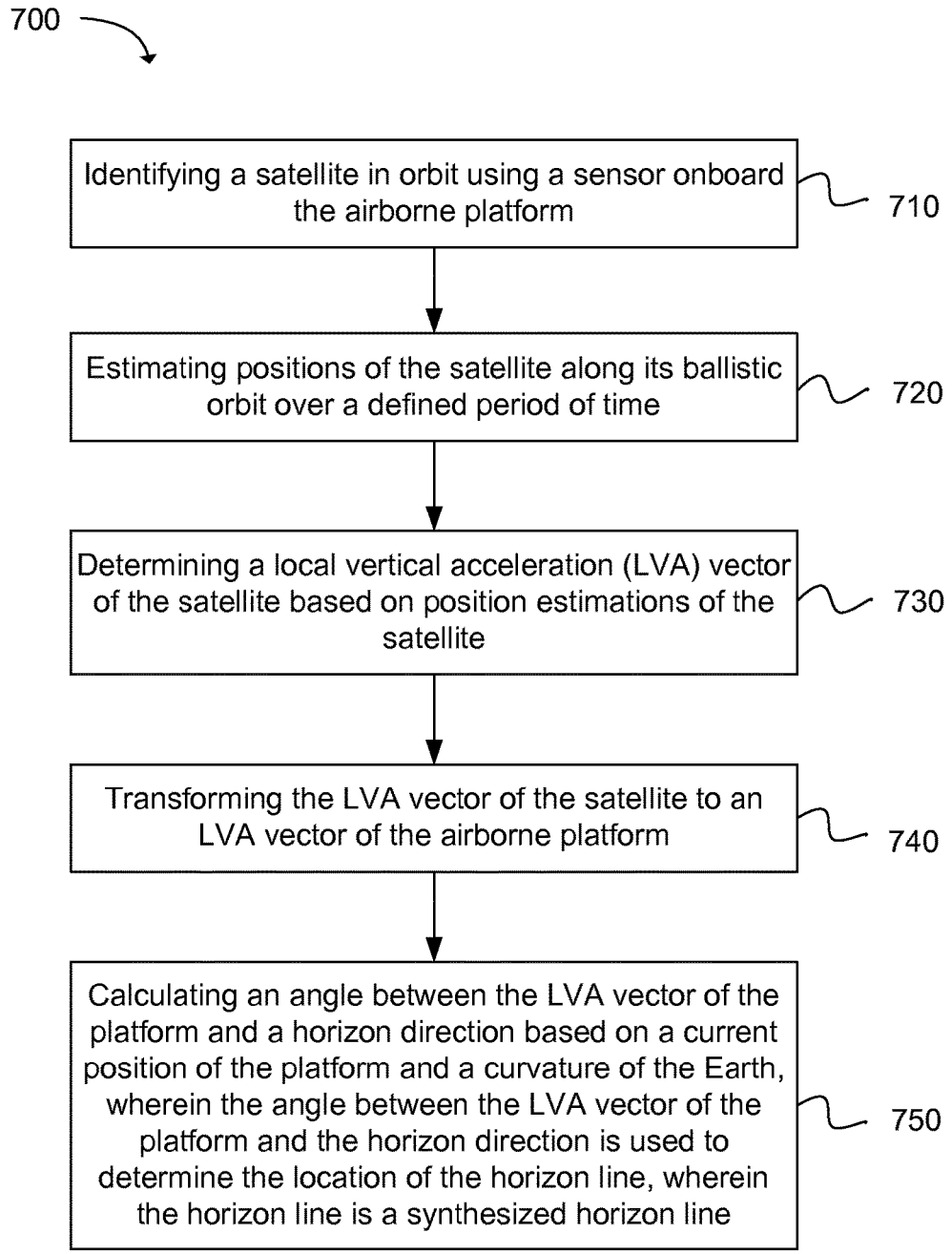
FIG. 7 depicts a flow chart of a method for determining a location of a synthetic horizon line from an airborne platform in accordance with an example.

FIG. 7 depicts an exemplary flow chart 700 of a method for determining a location of a synthetic horizon line from an airborne platform. The method can be executed as instructions on a machine, where the instructions are included on at least one computer readable medium or one non-transitory machine readable storage medium. The method can include identifying a satellite in orbit using a sensor onboard the airborne platform, as in block 710. The method can include estimating positions of the satellite along its ballistic orbit over a defined period of time, as in block 720. The method can include determining a local vertical acceleration (LVA) vector of the satellite based on position estimations of the satellite, as in block 730. The method can include transforming the LVA vector of the satellite to an LVA vector of the airborne platform, as in block 740. The method can include calculating an angle between the LVA vector of the platform and a horizon location based on a current position of the platform and a curvature of the Earth, wherein the angle between the LVA vector of the platform and the horizon direction is used to determine the location of the horizon line, wherein the horizon line is a synthesized horizon line, as in block 750.

In one example, differential angular measurements between the synthetic horizon line and a plurality of celestial objects are identified in order to determine a position of the airborne platform. In one example, the satellite includes a Low Earth Orbit (LEO) satellite. In one example, the sensor is an electro-optical infrared (EO/IR) sensor.

Figure 8:
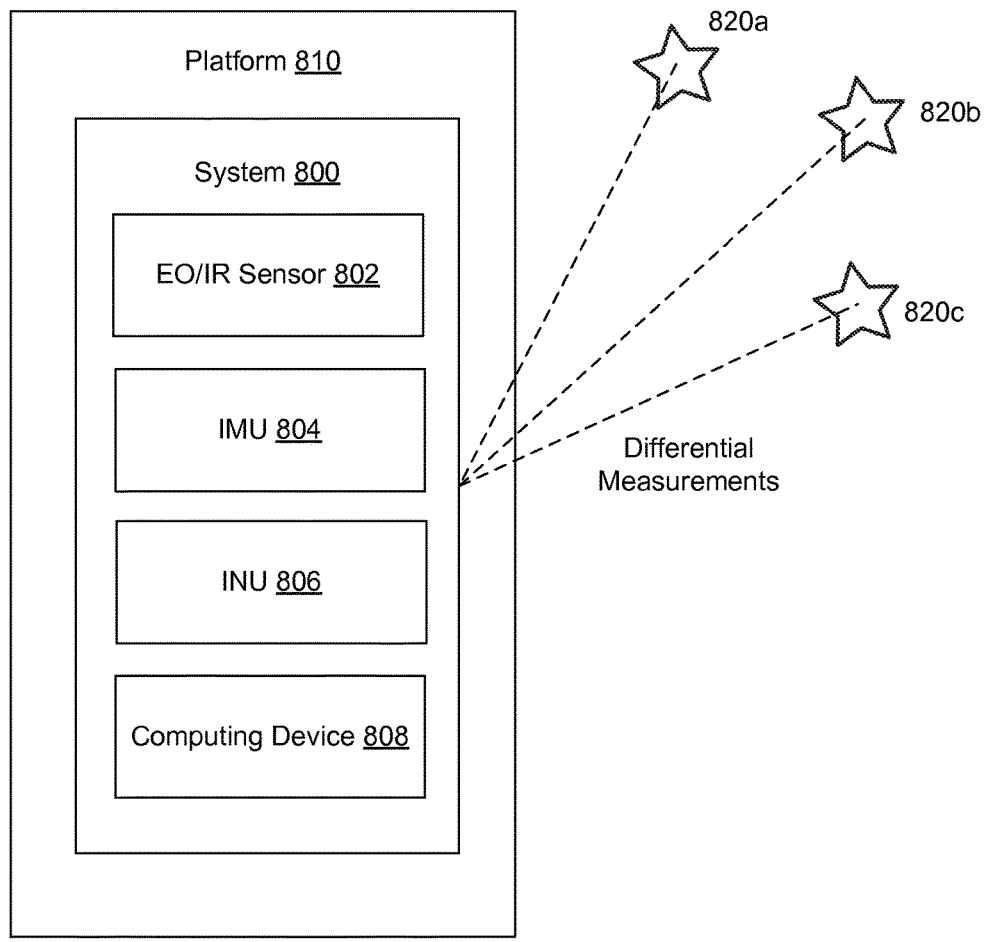
FIG. 8 depicts a system onboard a platform that is operable to determine a position of the platform in accordance with an example.

FIG. 8 depicts an exemplary system 800 onboard a platform 810 that is operable to determine a position of the platform 810. The system 800 can include an electro-optical infrared (EO/IR) sensor 802, an inertial measurement unit (IMU) 804, an inertial navigation unit (INU) 806 and a computing device 808. The computing device 808 can comprise a processor; and a memory device including a data store to store a plurality of data and instructions that, when executed by the processor, cause the processor to: identify a location of a horizon line based on measurements collected from the EO/IR sensor 802 onboard the platform 810; identify one or more celestial objects 820a-c in the sky based on measurements collected from the EO/IR sensor 802 onboard the platform 810; determine differential angular measurements between the horizon line and the celestial objects 820a-c in the sky over a duration of time; and determine the position of the platform 810 using the differential angular measurements between the horizon line and the celestial objects 820a-c, IMU measurements collected from the IMU 804, and INU measurements collected from the INU 806.

In one example, the horizon line is a synthesized horizon line produced by a Low Earth Orbit (LEO) satellite on its ballistic orbit. In one example, the celestial objects 820a-c detected using the EO/IR sensor 802 onboard the platform 810 includes at least one of stars, satellites or the moon. In one example, a Kalman filter is used to determine the position of the platform 810 using the differential angular measurements, the IMU measurements and the INU measurements. In one example, the position of the platform 810 is determined using at least five differential angular measurements with respect to at least five celestial objects and the horizon line. In one example, the differential angular measurements are used to derive three position parameters and cancel out two line of sight (LOS) bias parameters, the three position parameters including latitude, longitude and altitude and the two LOS bias parameters including elevation and azimuth.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defecto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for determining a position of a platform, the method comprising:
    determining a location of a horizon line using a sensor onboard the platform;
    detecting one or more celestial objects in the sky using the sensor onboard the platform;
    determining differential angular measurements between the horizon line and at least one of the celestial objects in the sky over a duration of time; and
    determining the position of the platform based on the differential angular measurement between the horizon line and the celestial objects, wherein the horizon line is at least one of an actual horizon line or a synthesized horizon line, and wherein the synthesized horizon line is produced by observing a satellite in its ballistic orbit.

2. The method of claim 1, wherein the step of determining the location of the horizon line further comprises:
    identifying a satellite in orbit using the sensor onboard the platform;
    estimating positions of the satellite along its ballistic orbit over a defined period of time;
    determining a local vertical acceleration (LVA) vector of the satellite based on position estimations of the satellite;
    transforming the LVA vector of the satellite to an LVA vector of the platform; and
    calculating an angle between the LVA vector of the platform and a horizon line based on a current position of the platform and a curvature of the Earth, wherein the angle between the LVA vector of the platform and the horizon line is used to determine the location of the horizon line, wherein the horizon line is a synthesized horizon line.

3. The method of claim 1, further comprising identifying a set of differential angular measurements between the horizon line and the celestial objects in the sky over the duration of time, wherein the set of differential angular measurements are used to determine the position of the platform.

4. The method of claim 1, wherein the step of determining the differential angular measurements further comprises:
    identifying a first celestial object in the sky using the sensor, wherein the sensor measures a position of the first celestial object over multiple time points;
    determining a first differential measurement of a first angular difference between the first celestial object and the horizon line, wherein position measurements of the first celestial object over the multiple time points in relation to the horizon line are used to derive the first differential measurement;
    identifying a second celestial object in the sky, wherein an inertial measurement unit (IMU) onboard the platform detects an angular measurement between the first celestial object and the second celestial object;
    determining a second differential measurement of a second angular difference between the second celestial object and the horizon line, wherein positional measurements of the second celestial object over multiple time points in relation to the horizon line are used to derive the second differential measurement; and
    forming a set of differential measurements for the celestial objects in the sky with respect to the horizon line, the set of differential measurements including the first differential measurement and the second differential measurement.

5. The method of claim 4, further comprising:
    comparing the angular measurement between the first celestial object and the second celestial object as detected by the IMU to a known angular separation between the first celestial object and the second celestial object;
    estimating a level of atmospheric refraction based on a difference between the angular measurement as detected by the sensor and the IMU and the known angular separation; and
    mitigating the level of atmospheric refraction by extrapolating atmospheric refraction effects to the horizon line.

6. The method of claim 1, further comprising using a Kalman filter to process the differential angular measurements, inertial navigation unit (INU) measurements from the platform, and inertial measurement unit (IMU) measurements from the platform in order to estimate the position of the platform.

7. The method of claim 1, wherein the position of the platform is determined using at least five differential angular measurements with respect to at least five celestial objects and the horizon line.

8. The method of claim 1, further comprising deriving three position parameters and canceling out two line of sight (LOS) bias parameters using the differential angular measurements, the three position parameters including latitude, longitude and altitude and the two LOS bias parameters including elevation and azimuth.

9. The method of claim 1, wherein the sensor is an electro-optical infrared (EO/IR) sensor.

10. The method of claim 1, wherein the platform is an airborne platform.

11. The method of claim 1, wherein the celestial objects detected using the sensor onboard the platform include at least one of: stars, space debris, satellites or the moon.

12. A method for determining a location of a synthetic horizon line from a platform, the method comprising:
    identifying a satellite in orbit using a sensor onboard an airborne platform;
    estimating positions of the satellite along its ballistic orbit over a defined period of time;
    determining a local vertical acceleration (LVA) vector of the satellite based on position estimations of the satellite;
    transforming the LVA vector of the satellite to an LVA vector of the airborne platform; and
    calculating an angle between the LVA vector of the platform and a horizon direction based on a current position of the platform and a curvature of the Earth, wherein the angle between the LVA vector of the platform and the horizon direction is used to determine the location of the horizon line, wherein the horizon line is a synthesized horizon line.

13. The method of claim 12, wherein differential angular measurements between the synthetic horizon line and a plurality of celestial objects are identified in order to determine a position of the airborne platform.

14. The method of claim 12, wherein the satellite includes a Low Earth Orbit (LEO) satellite.

15. The method of claim 12, wherein the sensor is an electro-optical infrared (EO/IR) sensor.

16. A system onboard a platform that is operable to determine a position of the platform, the system comprising:
    an electro-optical infrared (EO/IR) sensor;
    an inertial measurement unit (IMU);
    an inertial navigation unit (INU); and
    a computing device, comprising:
        a processor; and
        a memory device including a data store to store a plurality of data and instructions that, when executed by the processor, cause the processor to:
        identify a location of a horizon line based on measurements obtained from the EO/IR sensor onboard the platform, wherein the horizon line is at least one of an actual horizon line or a synthesized horizon line, and wherein the synthesized horizon line is produced by observing a satellite in its ballistic orbit;
        identify one or more celestial objects in the sky based on measurements obtained from the EO/IR sensor onboard the platform;
        identify differential angular measurements between the horizon line and the one or more celestial objects in the sky over a duration of time; and
        determine the position of the platform using the differential angular measurements between the horizon line and the celestial objects, IMU measurements collected from the IMU, and INU measurements collected from the INU.

17. The system of claim 16, wherein the celestial objects detected using the EO/IR sensor onboard the platform include at least one of stars, space debris, satellites or the moon.

18. The system of claim 16, wherein a Kalman filter is used to determine the position of the platform using the differential angular measurements, the IMU measurements and the INU measurements.

19. The system of claim 16, wherein the position of the platform is determined using at least five differential angular measurements with respect to at least five celestial objects and the horizon line.

20. The system of claim 16, wherein the differential angular measurements are used to derive three position parameters and cancel out two line of sight (LOS) bias parameters, the three position parameters including latitude, longitude and altitude and the two LOS bias parameters including elevation and azimuth.

* * * * *